United States Patent
Vissenberg et al.

(10) Patent No.: US 9,603,222 B2
(45) Date of Patent: Mar. 21, 2017

(54) EMBEDDED LIGHTING CEILING TILES WITH AN ADAPTIVE CEILING LUMINANCE DISTRIBUTION

(71) Applicant: PHILIPS LIGHTING HOLDING B.V., Eindhoven (NL)

(72) Inventors: Michel Cornelis Josephus Marie Vissenberg, Roermond (NL); Maarten Van Lierop, s-Hertogenbosch (NL); Daniël Anton Benoy, Goldrop (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/897,203

(22) PCT Filed: Jun. 5, 2014

(86) PCT No.: PCT/EP2014/061643
§ 371 (c)(1),
(2) Date: Dec. 9, 2015

(87) PCT Pub. No.: WO2014/198615
PCT Pub. Date: Dec. 18, 2014

(65) Prior Publication Data
US 2016/0143117 A1    May 19, 2016

(30) Foreign Application Priority Data
Jun. 10, 2013 (EP) .................................. 13171167

(51) Int. Cl.
*F21S 8/00* (2006.01)
*H05B 37/02* (2006.01)
(Continued)

(52) U.S. Cl.
CPC .......... *H05B 37/0218* (2013.01); *F21S 8/046* (2013.01); *H05B 33/0812* (2013.01);
(Continued)

(58) Field of Classification Search
CPC .......................................................... F21S 8/00
(Continued)

(56) References Cited

U.S. PATENT DOCUMENTS 5,479,326 A    12/1995   Nilssen
6,211,626 B1 *  4/2001   Lys ..................... A61N 5/0616
                                                   315/291
(Continued)

FOREIGN PATENT DOCUMENTS

EP    0677697 A1    10/1995
EP    2055849 A1     6/2009
(Continued)

*Primary Examiner* — Minh D A
(74) *Attorney, Agent, or Firm* — Meenakshy Chakravorty

(57) ABSTRACT

The invention relates to a method for controlling a lighting system, wherein the lighting system comprises a plurality of light-emitting ceiling tiles and a control unit for controlling the plurality of light-emitting tiles. The method comprises the step of controlling the plurality of light-emitting tiles to provide a predetermined luminance contrast in the ceiling. The method further comprises the step of, for the predetermined luminance contrast, controlling the plurality of light-emitting tiles to provide a substantially uniform light distribution incident on a target surface such as a horizontal work plane. The method enables the lighting conditions in a room to be adjusted for improving visual comfort and illumination without affecting the illumination at a task level.

18 Claims, 3 Drawing Sheets

(51) Int. Cl.
*H05B 33/08* (2006.01)
*H05B 41/24* (2006.01)
*F21S 8/04* (2006.01)
*F21S 2/00* (2016.01)

(52) U.S. Cl.
CPC ....... *H05B 33/0854* (2013.01); *H05B 37/029* (2013.01); *H05B 41/245* (2013.01); *F21S 2/00* (2013.01); *Y02B 20/343* (2013.01)

(58) Field of Classification Search
USPC ......... 315/291, 307, 312; 362/147, 148, 150
See application file for complete search history.

(56) References Cited

U.S. PATENT DOCUMENTS

| | | | |
|---|---|---|---|
| 6,459,919 B1* | 10/2002 | Lys | A61N 5/0616 315/291 |
| 7,190,126 B1 | 3/2007 | Paton | |
| 7,766,511 B2* | 8/2010 | Zampini | F21S 2/00 362/294 |
| 2004/0155609 A1* | 8/2004 | Lys | H05B 33/0803 315/292 |
| 2005/0116667 A1* | 6/2005 | Mueller | E04F 13/08 315/312 |
| 2009/0122528 A1 | 5/2009 | Tsai et al. | |
| 2010/0259197 A1 | 10/2010 | Boleko Ribas | |

FOREIGN PATENT DOCUMENTS

| | | |
|---|---|---|
| EP | 2360431 A1 | 8/2011 |
| EP | 2418416 A1 | 2/2012 |
| EP | 2594846 A1 | 5/2013 |
| JP | H07153578 A | 5/1995 |
| WO | 9615649 A1 | 5/1996 |
| WO | 0040892 A1 | 7/2000 |
| WO | 2011039690 A1 | 4/2011 |

* cited by examiner

EMBEDDED LIGHTING CEILING TILES WITH AN ADAPTIVE CEILING LUMINANCE DISTRIBUTION

CROSS-REFERENCE TO PRIOR APPLICATIONS

This application is the U.S. National Phase application under 35 U.S.C. §371 of International Application No. PCT/EP2014/061643, filed on Jun. 5, 2014, which claims the benefit of European Patent Application No. 13171167.3, filed on Jun. 10, 2013. These applications are hereby incorporated by reference herein.

FIELD OF THE INVENTION

The invention relates to lighting controls. In particular, the invention relates to an improved lighting system and to a method for controlling a lighting system comprising light-emitting tiles.

BACKGROUND OF THE INVENTION

The development of new and more energy-efficient illumination devices is one of the important technical challenges which society faces. Common technologies which are more energy-efficient than traditional lighting solutions are often based on light-emitting diodes (LEDs). Currently, the reduced cost and improved performance of LEDs enable their use for general illumination. The small size of LEDs allows for easy integration of LEDs into building materials and furniture.

Combining these trends, the general illumination of an indoor space may be provided by a luminous ceiling, rather than by discrete fixtures in a dark ceiling. Such diffuse, large-area and low-brightness ceiling sources provide comfortable lighting with low glare and almost no shadows, while creating an aesthetic, clean ceiling without disturbing fixtures. The recent development of acoustic absorbing ceiling tiles with embedded lighting enables a full coverage of the ceiling with light without deteriorating the acoustics in the room.

Daylight through windows results in lighting that differs from indoor lighting in intensity, in color temperature, and directionality (shadows and contrast). Conventional indoor lighting systems may be equipped with photo-sensors, such that the increase in illumination level caused by daylight may be compensated by dimming down the artificial lighting. Unwanted gradients in illumination level are compensated by changing the dimming level as a function of the distance to the window, or by using a control loop to adjust the local illumination level to a certain predefined value. The controls may also be linked to blinds to regulate the amount of incoming daylight. An example of a prior art indoor lighting system with daylight controls can be found in U.S. Pat. No. 7,190,126, which also further describes an office lighting system with controls that regulate the light flux as function of the amount of daylight incident in a room.

SUMMARY OF THE INVENTION

It is a general object of the present invention to enable improved performance and visual comfort for lighting systems comprising light-emitting tiles and methods for controlling such lighting systems.

According to a first aspect of the invention, these and other objectives are achieved through the use of a method for controlling a lighting system, wherein the lighting system comprises a plurality of light-emitting tiles arranged in a ceiling and a control unit for controlling the plurality of light-emitting tiles, and wherein the method comprising the steps of (i) controlling the plurality of light-emitting tiles to provide a predetermined luminance contrast in the ceiling, and (ii) for the predetermined luminance contrast, controlling the plurality of light-emitting tiles to provide a substantially uniform light distribution incident on a target surface, for example a horizontal work plane.

By lighting system it should be understood that the purpose of the method and lighting system is to provide lighting, and that the light-emitting tiles, which are commonly driven by LEDs are the main components providing the light.

Luminance should be understood as the flux density emitted in a certain direction. Hence, luminance contrast is how a difference in luminance between an area of higher luminance and an area of lower luminance is perceived from a distant point by an observer. Controlling the plurality of light-emitting tiles to provide a luminance contrast thus comprises controlling the plurality of light-emitting tiles to provide areas, in the ceiling, of higher relative luminance and areas of lower relative luminance. For diffuse sources and diffuse reflectors (Lambertian sources or Lambertian reflectors), the luminance is independent of the viewing direction. Hence, the luminance contrast is directly linked to the flux, which will be the same from all viewing directions. Advantageously, the light-emitting tiles will be emitting and reflecting diffuse light, and therefore the luminance contrast may be set without taking the relative position of an observer into account.

A substantially uniform light distribution incident on a target surface should be interpreted as a substantially uniform illuminance. The target surface may be a horizontal work plane that is oriented substantially parallel to the ceiling in which the light-emitting tiles are arranged and located at a certain distance from the ceiling. An example of a horizontal work plane could be a desk in an office, or any similar work area in an indoor environment. The target surface should be at a distance from the ceiling at least equal to 1.5 to 2 times the spacing of the ceiling tiles for a uniform illumination to be provided. The need and desire for a substantially uniform illuminance is due to regulations which prescribe a minimum average illuminance and illuminance uniformity on target surfaces such as work planes, typically 500 lux for an office environment. The regulations aim to provide a minimum level of visual comfort. The uniformity of the illuminance may depend on the distance. For example, a relatively high uniformity on a desk, whereas the uniformity is allowed to be lower in the corner of a room. It is important that the lighting system ensures illumination uniformity on a target surface such as a horizontal work plane.

The luminance distribution in a room should not contain too harsh contrasts. A luminous ceiling may provide a low luminance contrast in the ceiling, which would be expected to provide a visual comfort. However, many people experience a substantially homogenous luminous ceiling as visually discomforting due to the lack of a luminance contrast in the ceiling.

The present invention is based on the realization that by using distributed lighting, such as light-emitting ceiling tiles, the lighting conditions in a room may be adjusted to improve the visual comfort and illumination without affecting the illumination at a task level. The ceiling, where the light-emitting tiles are arranged, covers a large part of the visual field in an indoor area and the light-emitting tiles are controlled to provide a luminance contrast in the ceiling. The light-emitting tiles are also controlled to provide a substantially uniform light incident on a target surface, hence the luminance contrast in the ceiling will provide an improved visual comfort or aesthetic appreciation of the room without changing the illumination at a work plane level. Accordingly, an improved visual comfort can be achieved even if only a portion of the ceiling tiles in an indoor area are controllable, even though it may be desirable to provide a ceiling where all ceiling tiles are light-emitting tiles.

According to one embodiment of the invention, the luminance contrast may be achieved by reducing the luminance of a first subset of the plurality of light-emitting tiles compared to a second subset. Reducing the luminance of a first subset of the plurality of light-emitting tiles to provide a luminance contrast compared to a second subset will hence provide a visual comfort to an observer in the room. To reduce the luminance from a subset of light-emitting tiles, the amount of light produced by one or more light-emitting tiles comprised in the subset can be reduced. Alternatively one or more light-emitting tiles in the subset could be switched off. However, a light-emitting tile which is switched off will still provide some luminance from light reflected by that light-emitting tile. Hence the reflectivity of light-emitting tiles or even ordinary tiles comprised in the ceiling may also be tuned, in both reflectance and the amount of diffuse reflection.

According to another embodiment of the invention, the luminance contrast may be achieved by reducing the luminance of a first subset of the plurality of light-emitting tiles and by increasing the luminance of a second subset of the plurality of light-emitting tiles. By increasing the luminance of a second subset of light-emitting tiles and reducing the luminance of a first subset of light-emitting tiles, a luminance contrast is provided as the contrast in luminance between the two subsets. In particular this effect can advantageously be used to provide a large luminance contrast between two subsets of light-emitting tiles.

According to one embodiment of the invention, the plurality of light-emitting tiles may be controlled based on daylight conditions. Daylight conditions will influence the amount of light in an indoor area comprising daylight entrances such as windows, and hence influence the illuminance in an indoor area where a lighting system is present. The influence of daylight conditions on the illuminance will be used to reduce energy consumption of the lighting system, through reducing the flux from the plurality of light-emitting tiles. Furthermore, if daylight is incident on the target surface, a subset of light-emitting tiles illuminating an area where daylight is incident may be turned off. If the daylight conditions introduce visual discomfort, the plurality of light-emitting tiles can be controlled such that the luminance contrast from the light-emitting tiles reduces this visual discomfort. Accordingly the plurality of light-emitting tiles may be controlled based on a time of day or on a weather forecast. The information of the time of day or the weather forecast will further be used to either counter the effect of daylight conditions, or to further reduce the energy consumption of the lighting system. The time of day or the weather forecast could be incorporated indirectly through predetermined values, or read from a database or a similar store of information. Another possibility is to directly sense the time of day or the present weather conditions through sensor means.

According to another embodiment of the invention, the plurality of light-emitting tiles may be controlled based on daylight incident on a surface illuminated by the plurality of light-emitting tiles. To further enhance the visual comfort the plurality of light-emitting tiles will be controlled based on daylight incident on a surface illuminated by the plurality of light-emitting tiles. The luminance contrast provided by the light-emitting tiles will be controlled to provide a visual comfort, and a substantially uniform light distribution on the surface, in other words the surface where the daylight is incident will in high likelihood perceive a lower illuminance from the light-emitting ceiling tiles compared to other surfaces in the same plane which do not have daylight incident upon them.

In one embodiment of the invention, if daylight is incident on a surface illuminated by a first subset of the plurality of light-emitting tiles, the plurality of light-emitting tiles may further be controlled such that a luminance contrast provided by the first subset of light-emitting tiles is lower than a luminance contrast provided by a second subset of light-emitting tiles, where the second subset of light-emitting tiles illuminates a surface where substantially less daylight is incident. Incident daylight will introduce luminance contrasts in an indoor area. To be able to provide a visual comfort, the light-emitting tiles should provide a luminance contrast in a portion of the ceiling which is illuminating a surface where no daylight is incident, to balance the luminance contrast introduced by daylight. Thereby providing a comfortable luminance contrast in the entire ceiling through the luminance contrast introduced by daylight in combination with the luminance contrast provided by the light-emitting tiles acting to balance the daylight According to one embodiment of the invention, the luminance of a first subset of light-emitting tiles may be controlled to be at least two times greater than a luminance of a second subset of light-emitting tiles adjacent to the first subset. A high luminance from a singular light-emitting tile may be perceived as disturbing and cause visual discomfort if adjacent ceiling tiles have a low luminance, just as a singular strong light bulb may be perceived. By providing a second subset of light-emitting tiles, adjacent to the first subset, which has a luminance at least two times lower, the visual discomfort will be avoided due to the lower luminance contrast between the two subsets, and further the luminance contrast between the second subset and adjacent light-emitting tiles which may be switched off, or adjacent conventional ceiling tiles. Accordingly, the luminance of a first subset of light-emitting tiles may be controlled to be between five and twenty times greater than a luminance of a second subset of light-emitting tiles adjacent to the first subset.

According to one embodiment the method may further comprise controlling the light-emitting tiles to change from a first predetermined luminance contrast pattern to a second predetermined luminance contrast pattern in the ceiling, and controlling the substantially uniform light distribution on the target surface to be the same for the first luminance pattern as for the second luminance pattern. By providing the possibility to form predetermined luminance patterns, an observer in the room can tailor the luminance contrast to his or her own liking, using different interesting luminance patterns while still maintaining the illuminance at the target surface (for example a work plane) substantially uniform. Furthermore a dynamic luminance contrast pattern can be introduced to create a more interesting appearance by varying the luminance contrast pattern. Moreover, the luminance contrast pattern may be adjusted to be more visually suitable for different activities, or to match the architecture or daylight condition in an indoor area. Accordingly, the method may further comprise controlling the light-emitting tiles to dynamically provide a plurality of predetermined luminance contrast patterns in the ceiling, and controlling the substantially uniform light distribution on the target surface to be the same for the plurality of predetermined luminance patterns. A plurality of predetermined luminance patterns could be cycled during a longer or shorter time period to further enhance the visual comfort in the room. For example, certain predetermined patterns could be used during the earlier hours in a workday and certain other patterns during the later hours, thereby providing the possibility to make people in the room more alert and sprightly through the cycling of luminance patterns in the ceiling. Furthermore, the contrast patters may be changed continuously to provide a ceiling which is dynamic while not influencing the target surface illumination.

According to a second aspect of the present invention, there is provided a lighting system comprising (i) a plurality of light-emitting tiles for being arranged in a ceiling, and (ii) a control unit arranged to control the plurality of light-emitting tiles, wherein the control unit is configured to control the plurality of light-emitting ceiling tiles to provide a predetermined luminance contrast in the ceiling, and for the predetermined luminance contrast, control the plurality of light-emitting of light-emitting tiles to provide a substantially uniform light distribution incident on a target surface.

According to one embodiment of the invention the lighting system further comprises a sensing unit arranged to sense lighting conditions within an indoor area, and configured to send a signal indicative of the lighting conditions to the control unit and the control unit is configured to control the plurality of light-emitting ceiling tiles to provide a predetermined luminance contrast and, for the predetermined luminance contrast, control the plurality of light-emitting tiles to provide a substantially uniform light distribution incident on a target surface based on the signal indicative of the lighting conditions. The sensing unit will be arranged such that it will sense lighting conditions within an indoor area where the lighting system is present. Advantageously, the control unit then controls the light-emitting tiles based on the signal from the sensing unit such that the light-emitting tiles provides a substantially uniform light distribution incident on the target surface. Furthermore, by lighting conditions, a number of parameters should be understood to be included such as flux, intensity, illuminance or luminance or lighting contrast, or hue, or color temperature, or influence of natural daylight through a window or a transparent ceiling of any sort.

According to another embodiment each of the plurality of light-emitting tiles may be individually controllable. By providing individually controllable light-emitting tiles more precise and exact control can be implemented.

In one embodiment of the invention, each of the light-emitting tiles may advantageously be adjacent to at least one other light-emitting tile. Thereby, for each light-emitting tile, a tunable luminance contrast can be provided between at least two tiles. A ceiling comprising only light-emitting ceiling tiles would naturally provide the highest degree of control of the luminance which can be provided. However, for practical reasons it may not always be possible to have a ceiling entirely made up of light-emitting ceiling tiles. Even so, various embodiment of the present invention may be used to an advantage.

Effects and features of this second aspect of the present invention are largely analogous to those described above in connection with the first aspect of the invention.

Further features of, and advantages with, the present invention will become apparent when studying the appended claims and the following description. For example the light-emitting tiles may be driven by different light generators such as e.g. lasers, flash lamps, Xenon lamps or even X-ray sources. The skilled person will realize that different features of the present invention may be combined to create embodiments other than those described in the following, without departing from the scope of the present invention.

BRIEF DESCRIPTION OF THE DRAWINGS

This and other aspects of the present invention will now be described in more detail, with reference to the appended drawings showing an embodiment of the invention.

DETAILED DESCRIPTION OF THE EMBODIMENTS

In the present detailed description, various embodiments of a lighting system according to the present invention are mainly discussed with reference to a lighting system comprising light-emitting tiles having light-emitting diodes (LEDs) as a light source. It should be noted that this by no means limits the scope of the invention, which is also applicable in other circumstances, for example for use with other types of light sources. Moreover the amount of light-emitting ceiling tiles shown in the enclosed drawings is only a schematic representation. In use, the arrangement, number, or percentage of light-emitting tiles in relation to the total number of ceiling tiles and other such details will be decided by each application.

Figure 1:
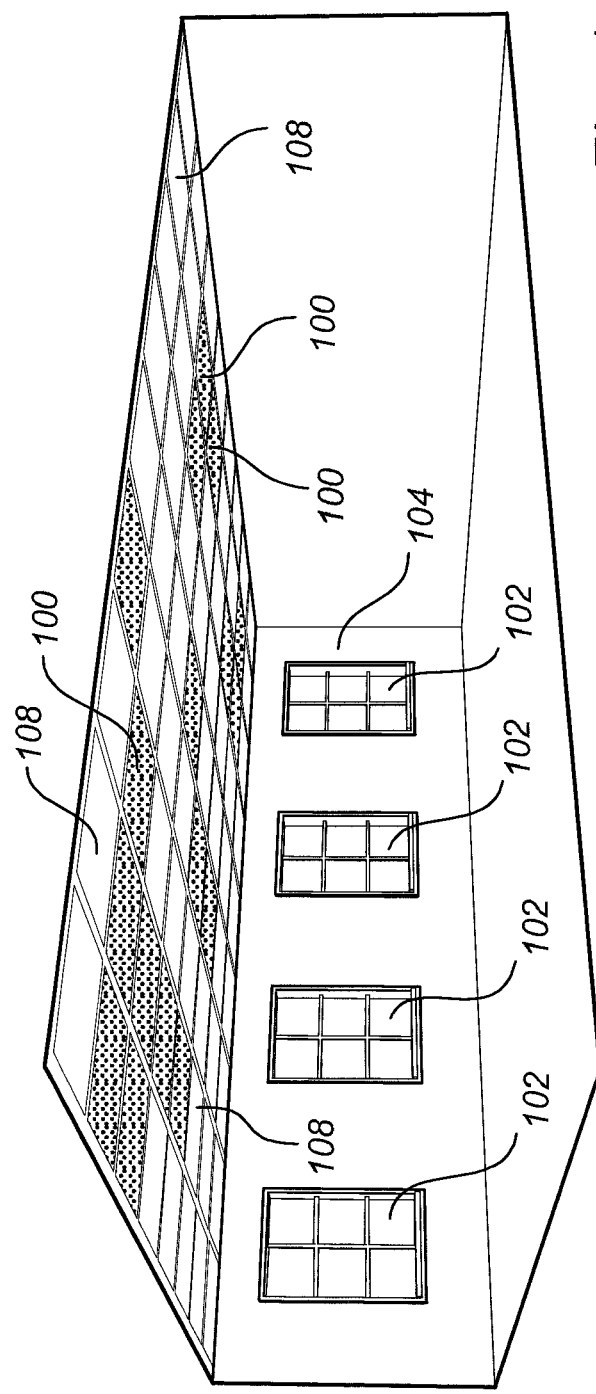
FIG. 1 is a perspective view of an indoor area where light-emitting tiles are arranged in the ceiling and controlled according to an embodiment of the invention.

FIG. 1 is a perspective view of an indoor area where a lighting system according to the present invention is installed in an indoor area. The lighting system comprises illuminating tiles 100 and non-illuminating tiles 108, both arranged in a ceiling. The illuminating tiles 100 and non-illuminating tiles 108 may both be light-emitting tiles, wherein the non-illuminating tiles 108 have their luminance reduced or wherein they have been switched off. The combination of illuminating tiles 100 and non-illuminating tiles 108 provides a luminance contrast in the ceiling, which covers a large part of the visual field. The indoor area further has windows 102 providing an entrance for daylight, which may affect the lighting conditions and luminance contrast in the indoor area.

Figure 2:
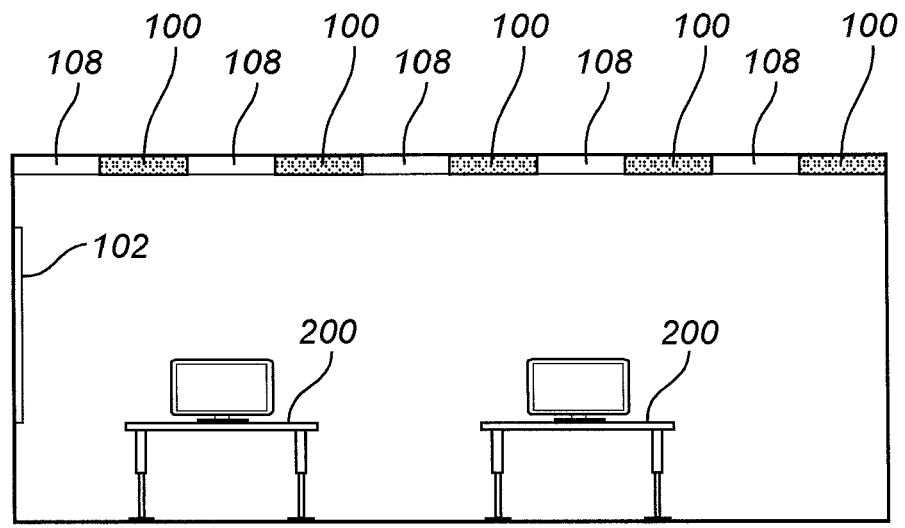
FIG. 2 is a schematic side view of light-emitting tiles arranged in the ceiling and controlled according to an embodiment of the invention.

Now referring to FIG. 2, a schematic side view of an indoor area comprising an exemplary embodiment of the invention is shown. The indoor area comprises a window 102, illuminating light-emitting tiles 100 and non-illuminating tiles 108. The non-illuminating tiles 108 are light-emitting tiles which are turned off. If all tiles were illuminating the ceiling would only provide a uniform light-emitting surface, which as described earlier may be experienced by some as boring and visually uncomfortable. Hence to achieve the same lighting as if each tile was providing a luminance of 300 cd/m$^2$, the illuminating light-emitting tiles in FIG. 2 will provide a luminance of 600 cd/m$^2$ while the non-illuminating tiles 108 provide a contrast. However, any setting between zero and maximum illumination from the non-illuminating tiles 108 which is not equal to the illumination from the illuminating tiles 100 will provide a contrast in the ceiling and thereby a visual comfort. Furthermore, the light-emitting tiles may be controlled individually, which gives the largest flexibility in the lighting conditions which may be created, or they may be grouped into subsets comprising a row of tiles or part of a row, where each subset is controllable. The illuminating light-emitting tiles 100 and non-illuminating tiles 108 are controlled by the control unit (not shown) to provide a luminance contrast in the ceiling, thereby providing an improved visual comfort in the room which may improve the appreciation or contrast which matches the architecture, activity at hand or the daylight conditions. Furthermore the illuminating light-emitting tiles 100 and non-illuminating tiles 108 provide a substantially uniform light distribution incident on a target surface, in this case a horizontal work plane. The horizontal work plane should be understood to be parallel to the ceiling, and located at a certain distance from the ceiling. The horizontal work plane is illustrated in FIG. 2 as the plane comprising the desks 200. The luminance contrast in the ceiling can be adapted to provide visual comfort in the indoor area while the illuminance at a task level or work plane such as the horizontal work plane 200 is substantially uniform and fulfills regulations governing the requirements of work plane illumination. By adapting the luminance contrast in the ceiling, it should be understood that the control unit (not shown) is able to increase or decrease the luminance from the illuminating light-emitting tiles 100 as well as the luminance from the non-illuminating light-emitting tiles 108.

Figure 3:
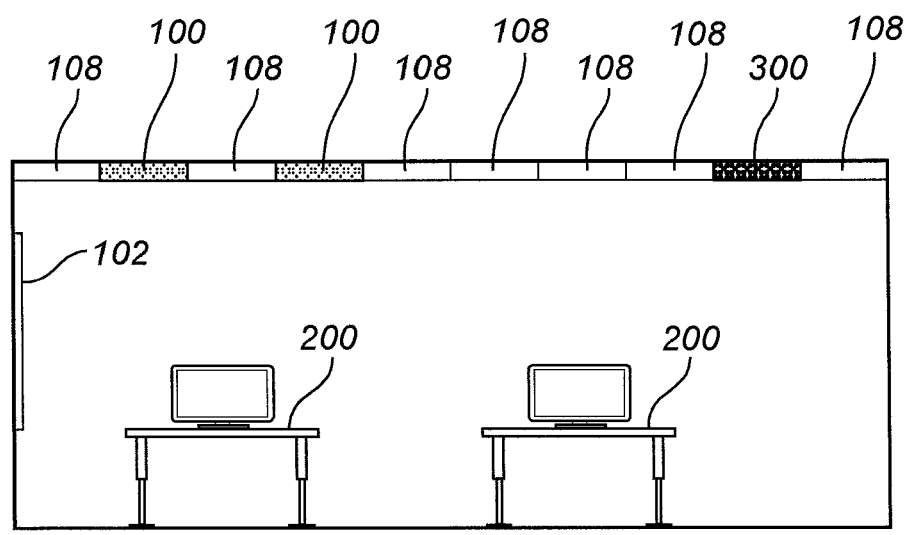
FIG. 3 is a schematic side view of light-emitting tiles arranged in the ceiling and controlled according to another embodiment of the invention.

In FIG. 3, a schematic side view of an indoor area comprising an exemplary embodiment of the invention is shown. The indoor area comprises a window 102, illuminating light-emitting tiles 100, non-illuminating tiles 108 and a work plane 200 to be illuminated. Compared to the embodiment shown in FIG. 2, a subset of the light-emitting tiles has their luminance reduced and can now be seen as non-illuminating tiles 108. By reducing the illumination of a subset of light-emitting tiles, the luminance contrast in the ceiling may be adapted to provide an improved visual comfort, or to provide a light distribution incident on the horizontal work plane 200 such that the light distribution is uniform even under the presence of daylight through the window 102. Furthermore, to balance the effect of daylight incident through a window, which may create sharp contrasts, a second subset of light-emitting tiles 300 can be controlled to provide a luminance contrast which is higher, through concentrating the light flux to one or several tiles, in the example in FIG. 3 one tile with a luminance as high as 2000 cd/m$^2$. The high light flux of the second subset of tiles 300 should then be compared to a luminance contrast provided by a first subset of light-emitting tiles which is lower, for example 300 cd/m$^2$, where the first subset are directly illuminating a surface where daylight is incident.

Figure 4:
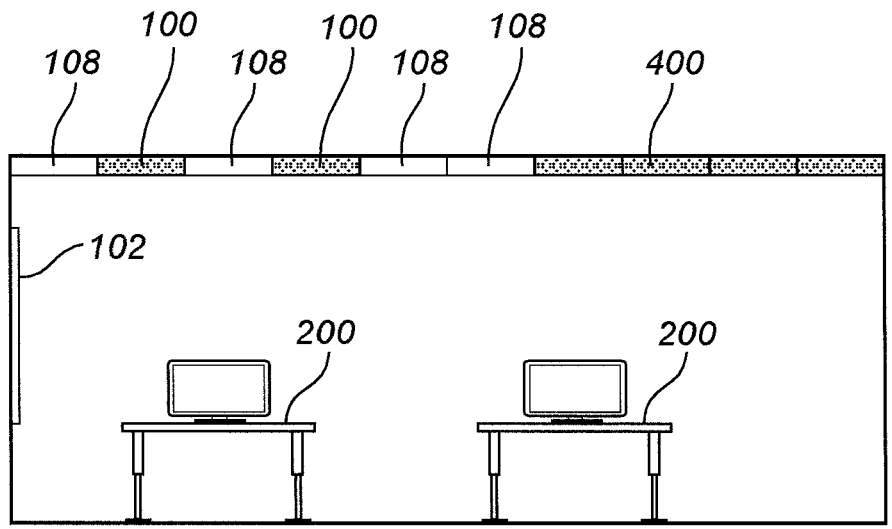
FIG. 4 is a schematic side view of light-emitting tiles arranged in the ceiling and controlled according to an embodiment of the invention.

Now referring to FIG. 4, a schematic side view of an indoor area comprising an exemplary embodiment of the invention is shown. The indoor area comprises a window 102, illuminating light-emitting tiles 100, non-illuminating tiles 108 and a work plane 200. In the embodiment shown in FIG. 4 there is a subset of light-emitting tiles 400 which are arranged farther away from the window 102, and which are controlled to counter the effect of daylight incident through the window 102. In comparison to the embodiment shown in FIG. 3 the subset of light-emitting tiles 400 will provide the same luminance contrast as the other illuminating light-emitting tiles 100 while balancing the effect of daylight through the window 102, and hence provide a constant illuminance at the desks 200.

Figure 5:
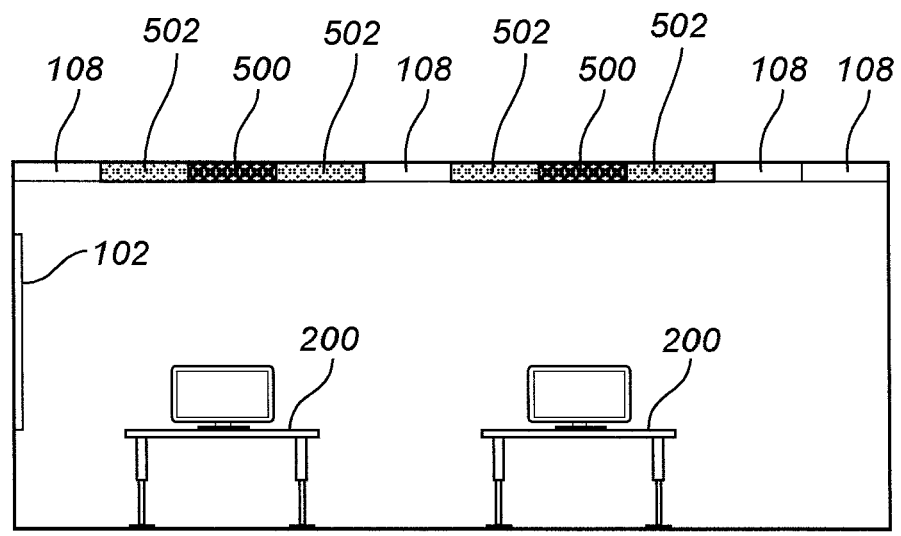
FIG. 5 is a schematic side view of light-emitting tiles arranged in the ceiling and controlled according to another embodiment of the invention.

FIG. 5 shows a schematic side view of an indoor area comprising a window 102 and illuminating light-emitting tiles 500, 502 and non-illuminating light-emitting tiles 108. A first subset of the light-emitting tiles comprises light-emitting tiles 500 having a higher luminance compared to a second subset of light-emitting tiles 502, where the second subset is adjacent to the first subset. By providing a second subset adjacent to the first subset which has a lower luminance, a too high luminance contrast will be avoided and a visual comfort will be provided. Preferably the luminance of the first subset 500 is at least two times higher than the luminance of the second subset 502, or even more preferably the luminance difference between the second subset and first subset can be between five and twenty times. Accordingly, the first subset can provide a luminance of 2000 cd/m$^2$, the second subset can provide a luminance of 200 cd/m$^2$, and the non-illuminating tiles typically have a luminance by reflection only of around 50 cd/m$^2$.

Additionally, variations to the disclosed embodiments can be understood and effected by the skilled person in practicing the claimed invention, from a study of the drawings, the disclosure, and the appended claims. For example, some of the non-illuminating tiles in the embodiments shown in Figures may be conventional ceiling tiles. For example steps in the method could be implemented as software in the control unit or as preprogrammed electronic circuits. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for controlling a lighting system, wherein the lighting system comprises
   a plurality of light-emitting tiles comprising illuminating tiles and non-illuminating tiles arranged as a pattern in a ceiling, and
   a control unit for controlling the plurality of light-emitting tiles, and wherein the method comprises the steps of:
      controlling the plurality of light-emitting tiles to provide a predetermined luminance contrast between the illuminating tiles and the non-illuminating tiles in the ceiling, the non-illuminating tiles having a reduced luminance as compared to the illuminating tiles; and
      for the predetermined luminance contrast, controlling said pattern to provide a uniform light distribution incident on a target surface.

2. The method according to claim 1, wherein the luminance contrast is achieved by reducing the luminance of the non-illuminating tiles and by increasing the luminance of the illuminating tiles.

3. The method according to claim 1, wherein the plurality of light-emitting tiles is controlled based on daylight incident on a surface illuminated by the plurality of light-emitting tiles.

4. The method according to claim 3, wherein
the illuminating tiles comprise a first subset of illuminating tiles and a second subset of illuminating tiles, the second subset being arranged for illuminating a surface where substantially less daylight is incident, and
the controlling the plurality of light-emitting tiles comprises providing a second luminance contrast between the second subset and the non-illuminating tiles, the second luminance contrast being greater than the luminance contrast.

5. The method according to claim 1, wherein a luminance of a first subset the illuminating tiles is controlled to be at least two times greater than a luminance of a second subset of the illuminating tiles adjacent to the first subset.

6. The method according to claim 1, wherein a luminance of a first subset of illuminating tiles is controlled to be between five and twenty times greater than a luminance of a second subset of illuminating tiles adjacent to the first subset.

7. The method according to claim 1, further comprising the steps of:
controlling the light-emitting tiles to change from a first predetermined luminance contrast pattern to a second predetermined luminance contrast pattern in the ceiling, and
controlling the uniform light distribution on the target surface to be the same for the first luminance contrast pattern and for the second luminance contrast pattern.

8. The method according to claim 7, further comprising the steps of:
controlling the light-emitting tiles to dynamically provide a plurality of predetermined luminance contrast patterns in the ceiling, and
controlling the uniform light distribution on the target surface to be the same for the plurality of predetermined luminance patterns.

9. The method according to claim 1, wherein the target surface is remote from said lighting system and is illuminated by at least each of said illuminating tiles.

10. The method according to claim 1, further comprising:
sensing lighting conditions including lighting from an external source, wherein said lighting from the external source illuminates first portions of said target surface greater than second portions of said target surface, and wherein the controlling the plurality of light-emitting tiles comprises forming said uniform light distribution over said first and second portions by configuring the plurality of light-emitting tiles to illuminate the second portions greater than said first portions in response to the sensed lighting conditions.

11. The method according to claim 10, wherein said lighting from the external source is daylight.

12. A lighting system comprising;
a plurality of light-emitting tiles comprising illuminating tiles and non-illuminating tiles arranged for being arranged as a pattern in a ceiling; and
a control unit arranged to control the plurality of light-emitting tiles,
wherein the control unit is configured to control the plurality of light-emitting tiles to provide a predetermined luminance contrast between the illuminating tiles and the non-illuminating tiles in the ceiling, the non-illuminating tiles having a reduced luminance as compared to the illuminating tiles and, for the predetermined luminance contrast, control said pattern to provide a uniform light distribution incident on a target surface.

13. The lighting system according to claim 12, further comprising a sensing unit arranged to sense lighting conditions within an indoor area, and configured to send a signal indicative of the lighting conditions to the control unit; wherein the control unit is configured to control the pattern to provide a predetermined luminance contrast and, for the predetermined luminance contrast, control the plurality of light-emitting tiles to provide a uniform light distribution incident on a target surface (200) based on the signal indicative of the lighting conditions.

14. The lighting system according to claim 12, wherein each light-emitting tile of the plurality of light-emitting tiles is individually controllable by the control unit.

15. The lighting system according to claim 12, wherein each light-emitting tile of the plurality of light-emitting tiles is adjacent to at least one other light-emitting tile of the plurality of light-emitting tiles.

16. The lighting system according to claim 12, wherein the target surface is remote from said lighting system and is illuminated by at least each of said illuminating tiles.

17. The lighting system according to claim 12, further comprising:
a sensor configured to sense lighting conditions including lighting from an external source, wherein said lighting from the external source illuminates first portions of said target surface greater than second portions of said target surface, and wherein the control unit is configured to control the plurality of light-emitting tiles to form said uniform light distribution over said first and second portions by configuring the plurality of light-emitting tiles to illuminate the second portions greater than said first portions in response to the sensed lighting conditions.

18. The lighting system according to claim 17, wherein said lighting from the external source is daylight.

* * * * *